(12) United States Patent
Hsieh et al.

(10) Patent No.: US 7,609,041 B2
(45) Date of Patent: Oct. 27, 2009

(54) AUTOMATIC VOLTAGE CONTROL CIRCUIT AND METHOD THEREOF

(75) Inventors: Meng-Han Hsieh, Hsin-Chu (TW); Chi-Shun Weng, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 156 days.

(21) Appl. No.: 11/772,233

(22) Filed: Jul. 1, 2007

(65) Prior Publication Data

US 2008/0122421 A1    May 29, 2008

(30) Foreign Application Priority Data

Jul. 6, 2006    (TW) .............. 95124599 A

(51) Int. Cl.
*G05F 1/00* (2006.01)

(52) U.S. Cl. .................................... 323/283

(58) Field of Classification Search ........... 323/283, 323/284, 285
See application file for complete search history.

(56) References Cited

U.S. PATENT DOCUMENTS

| | | | |
|---|---|---|---|
| 4,095,165 A * | 6/1978 | Boros ................ | 323/283 |
| 5,218,283 A * | 6/1993 | Wills et al. .......... | 318/748 |
| 6,535,735 B2 | 3/2003 | Underbrink et al. | |
| 6,911,840 B1 | 6/2005 | Milne | |
| 7,098,635 B2 * | 8/2006 | Burton ............... | 323/266 |
| 2005/0146315 A1 | 7/2005 | Burton | |

FOREIGN PATENT DOCUMENTS

| | | |
|---|---|---|
| TW | 432271 | 5/2001 |
| TW | 243976 | 11/2005 |

* cited by examiner

*Primary Examiner*—Shawn Riley
(74) *Attorney, Agent, or Firm*—Muncy, Geissler, Olds & Lowe, PLLC

(57) ABSTRACT

An automatic voltage control circuit controls a power supply unit to adjust a supply voltage provided by the power supply unit. The automatic voltage control circuit includes an oscillating unit, a frequency-comparing unit, and a control unit. The oscillating unit generates an oscillating signal. The frequency-comparing unit compares the oscillating frequency of the oscillating signal with at least one predetermined threshold frequency. The control unit controls the power supply unit to adjust the supply voltage according to the comparing result generated by the frequency-comparing unit.

10 Claims, 4 Drawing Sheets

AUTOMATIC VOLTAGE CONTROL CIRCUIT AND METHOD THEREOF

BACKGROUND OF THE INVENTION

1. Field of the Invention

The invention relates to a voltage control of a digital circuit, and more particularly, to an automatic voltage control circuit and related method for dynamically adjusting a supply voltage according to the condition of the circuit operation.

2. Description of the Prior Art

In digital circuit design, one or more clocks are utilized to manage the synchronization of flip-flops such as D-type flip-flops (DFFs). When a clock triggers the flip-flop, the value at the data input node must be stable so that the flip-flop can sample the value correctly. Therefore, the clock frequency used by the digital circuit is limited by the signal transmission speed between the flip-flops. In other words, when designing the digital circuit, it is necessary to guarantee that the period of the clock is not less than the time required for signal transmission between flip-flops.

In digital circuits, however, many factors such as process, ambient temperature and supply voltage influence the signal transmission speed. The signal transmission speed may also become slower due to process variation, and increases in ambient temperature and decreases in supply voltage also result in slower signal transmission speeds. To confirm the circuit can correctly operate under varying conditions, a circuit design method called worst case analysis is introduced in the circuit design. But designing a circuit with this prior art method results in larger circuit layout area and greater power consumption during operation.

Power consumption is very important for electronic products, especially for portable electronic devices whose power is provided mainly by the batteries. Excess power consumption in the portable electronic device will rapidly exhaust the limited battery power and will shorten the standby/operating time. As a result, users are inconvenienced to change or recharge the batteries more often. Therefore, designers of electronic products constantly seek to decrease power consumption in their designs.

SUMMARY OF THE INVENTION

It is therefore one of the objectives of the present invention to provide an automatic voltage control circuit and related method for dynamically adjusting a supply voltage according to the condition of the circuit operation.

According to one exemplary embodiment of the present invention, an automatic voltage control circuit for controlling a power supply unit to adjust a supply voltage provided by the power supply unit is provided. The automatic voltage control circuit comprises: an oscillating unit, coupled to the power supply unit, for generating an oscillating signal; a frequency-comparing unit, coupled to the oscillating unit, for comparing an oscillating frequency of the oscillating signal with at least one predetermined threshold frequency to generate a comparison result; and a control unit, coupled to the frequency-comparing unit and the power supply unit, for controlling the power supply unit to adjust the supply voltage according to the comparison result.

According to the exemplary embodiment of the present invention, an automatic voltage control method for controlling a power supply unit to adjust a supply voltage provided by the power supply unit is further provided. The method includes: generating an oscillating signal; comparing an oscillating frequency of the oscillating signal with at least one predetermined threshold frequency to generate a comparison result; and controlling the power supply unit to adjust the supply voltage according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
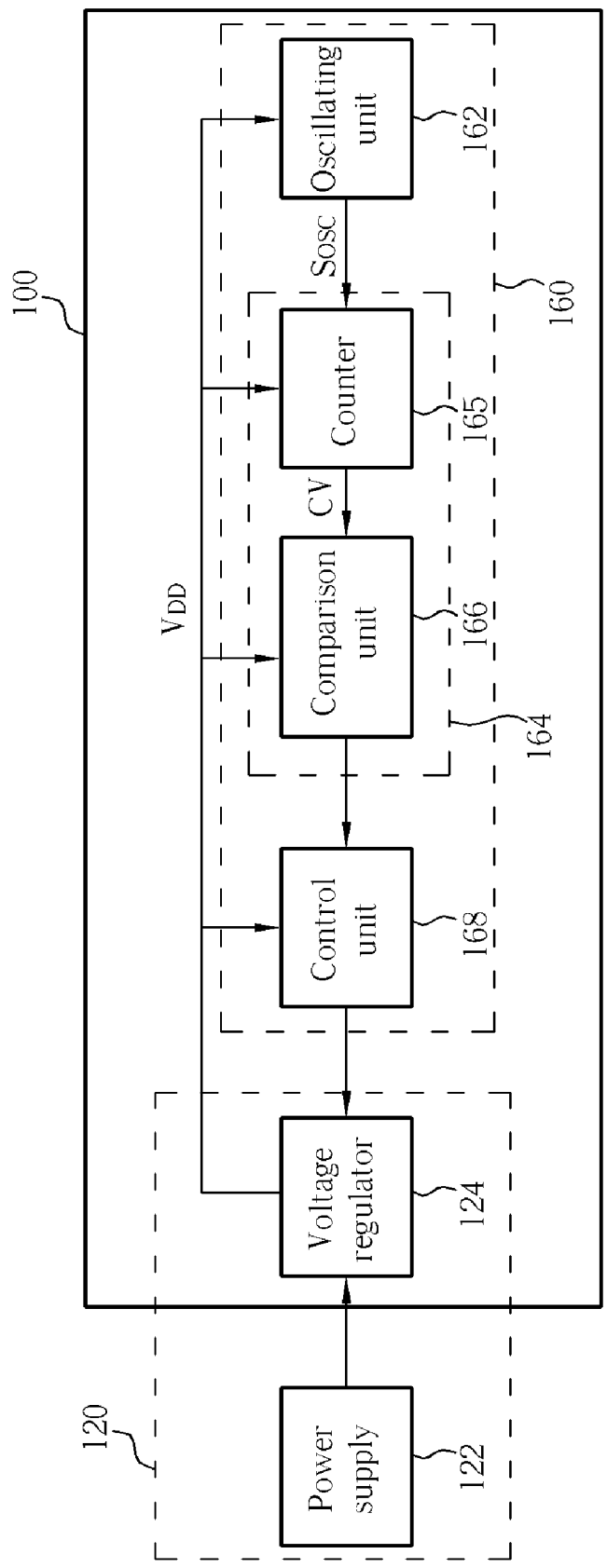
FIG. 1 is a diagram illustrating an automatic voltage control circuit according to one embodiment of the present invention.

FIG. 1 is a diagram illustrating an automatic voltage control circuit according to one embodiment of the present invention. In this embodiment, an automatic voltage control circuit 160 is disposed in a chip 100; and a power supply unit 120 is utilized to generate a supply voltage $V_{DD}$ for providing power required by operations of internal devices of the chip 100. In this embodiment, the power supply unit 120 includes a power supply 122 positioned outside the chip 100 and a voltage regulator 124 positioned inside the chip 100; and the automatic voltage control circuit 160 includes an oscillating unit 162, a frequency-comparing unit 164 and a control unit 168.

The oscillating unit 162 is utilized for generating an oscillating signal $S_{OSC}$. Because the power required by the oscillating unit 162 is provided by the supply voltage $V_{DD}$, the voltage level of supply voltage $V_{DD}$ will influence the oscillating frequency $f_{OSC}$ of the oscillating signal $S_{OSC}$. Generally speaking, the greater the supply voltage $V_{DD}$, the faster the operating speed of the devices in chip 100, and therefore the higher the oscillating frequency $f_{OSC}$ is; the lower the supply voltage $V_{DD}$, the slower the operating speed of the devices in chip 100, and therefore the lower the oscillating frequency $f_{OSC}$ is. In this embodiment, the automatic voltage control circuit 160 can control the voltage regulator 124 to adjust the supply voltage $V_{DD}$ to an appropriate voltage level by detecting the value of the oscillating frequency $f_{OSC}$ to thereby decrease the power consumption of chip 100 when the operational conditions permit.

The frequency-comparing unit 164 is utilized to compare the oscillating frequency $f_{OSC}$ with at least one predetermined threshold frequency $f_{TH}$ to generate a comparison result; the control unit 168 is utilized to control the voltage regulator 124 to adjust the supply voltage $V_{DD}$ to an appropriate voltage level according to the comparison result generated by the frequency-comparing unit 164. The frequency-comparing unit 164 in this embodiment is implemented by including a counter 165 and a comparison unit 166. The counter 165 is utilized to count an oscillating number of the oscillating signal $S_{OSC}$ during a counting period to generate a counting value CV; and the comparison unit 166 is utilized to compare the counting value CV and at least one predetermined threshold value TH, where the predetermined threshold value TH corresponds to the predetermined threshold frequency $f_{TH}$ mentioned. Therefore, the control unit 168 can control the voltage regulator 124 to adjust the supply voltage $V_{DD}$ to an appropriate voltage level according to the comparison result generated by the comparison unit 166 comparing the counting value CV with at least one predetermined threshold value TH, where the voltage level of the supply voltage does not exceed a predetermined range.

For example, if the counting value CV is greater than a first predetermined threshold value TH1, meaning that the oscillating frequency $f_{OSC}$ of the oscillating signal $S_{OSC}$ is greater than a first predetermined threshold frequency $f_{TH1}$, implying that the operating speed of the chip 100 is faster than the required operating speed. At this time, the control unit 168 can control the voltage regulator 124 to decrease the supply voltage $V_{DD}$. Therefore, under the allowed operational conditions, the power consumption of the chip 100 can be decreased properly and the heat accumulated during operation of the chip 100 is also reduced accordingly. If the counting value CV is less than a second predetermined threshold value TH2, it indicates that the oscillating frequency $f_{OSC}$ of the oscillating signal $S_{OSC}$ is lower than a second predetermined threshold frequency $f_{TH2}$, meaning that the operating speed of the chip 100 is slower than the required operating speed. At this time, the control unit 168 can control the voltage regulator 124 to increase the supply voltage $V_{DD}$ to guarantee normal operation of the chip 100. The above-mentioned first and second predetermined threshold values TH1 and TH2 are values determined by means of field trials, where the first predetermined threshold value TH1 is greater than the second predetermined threshold value TH2.

Figure 2:
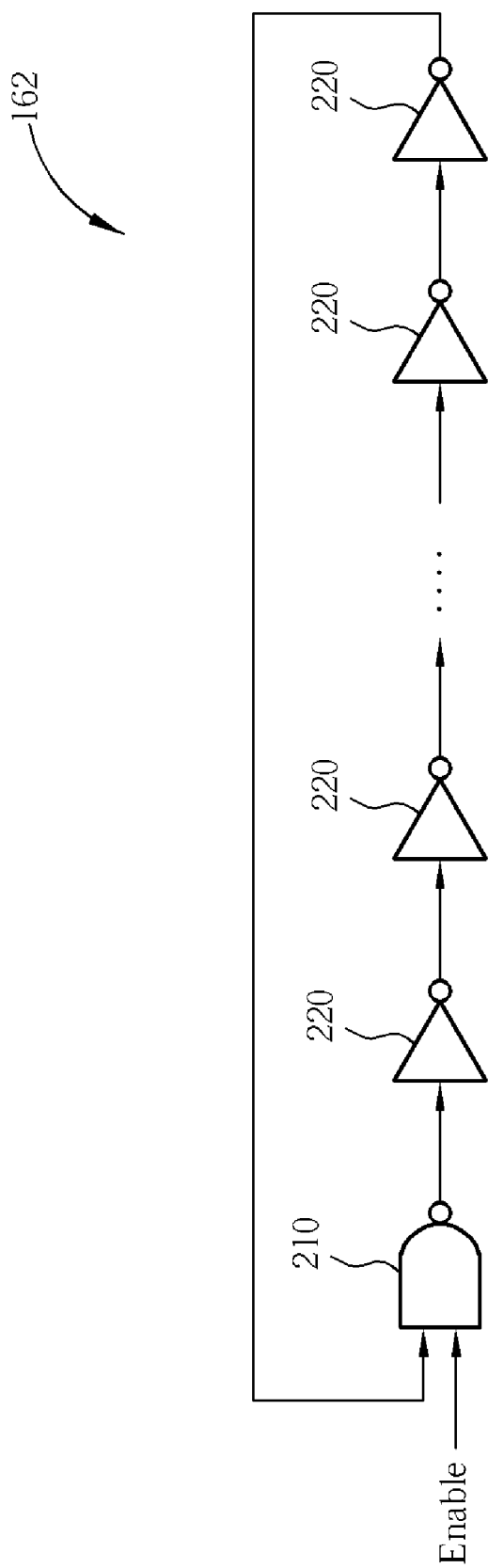
FIG. 2 is a diagram illustrating an embodiment of an oscillating unit shown in FIG. 1.

FIG. 2 is a diagram illustrating an embodiment of the oscillating unit 162 shown in FIG. 1. As shown in FIG. 2, the oscillating unit 162 is implemented by a ring oscillator including a NAND gate 210 and an even number of cascaded inverters 220. An input node of the NAND gate 210 is coupled to an output node of the right-most inverter 220. Another input node of the NAND gate 210 is coupled to an oscillating enable signal ENABLE. When the oscillating unit 162 does not need to oscillate, the oscillating enable signal ENABLE is at logic "0"; when the counter 165 needs to perform a counting operation, the oscillating enable signal ENABLE is at logic "1". The output signals of the NAND 210 and any one of the inverters 220 can be used to serve as the oscillating signal $S_{OSC}$ shown in FIG. 1.

Figure 3:
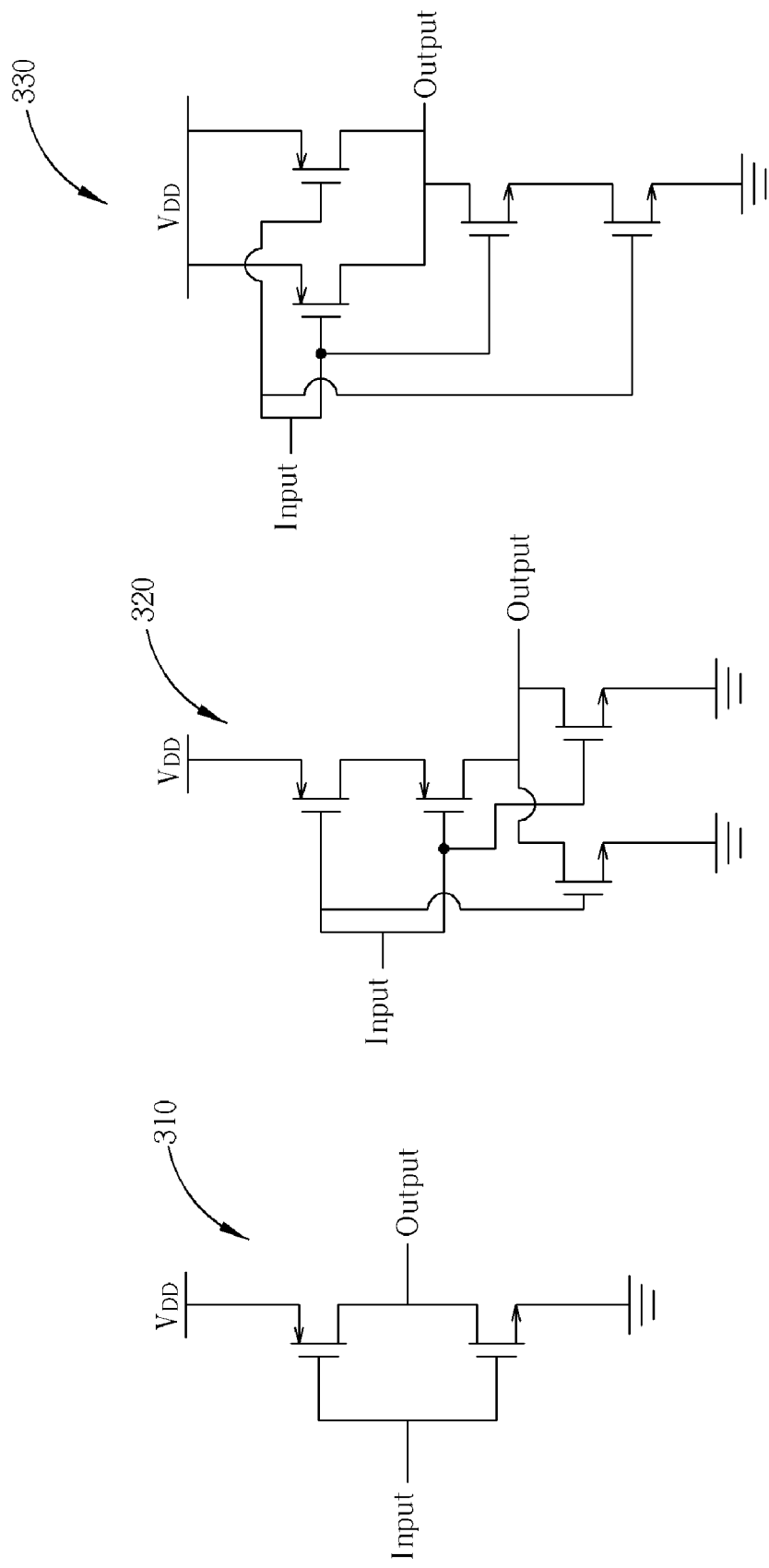
FIG. 3 illustrates three exemplary inverters of a ring oscillator shown in FIG. 2.

One of the exemplary implementations for the inverter 220 of the ring oscillator 162 is to use a complementary metal-oxide semiconductor (CMOS) inverter 310 shown in FIG. 3. However, the operation of the CMOS inverter 310 is influenced by both the P-type metal-oxide semiconductor (PMOS) and the N-type metal-oxide semiconductor (NMOS). In other words, the oscillating frequency $f_{OSC}$ of the ring oscillator 162 composed of the CMOS inverters 310 may not accurately represent the operating speed of the chip 100 dominated by the current path of the PMOS transistors, and also may not accurately represent the operating speed of the chip 100 dominated by the current path of the NMOS transistors. Therefore, other exemplary implementations can be applied to realize each inverter 220 of the ring oscillator 162. For example, in FIG. 3, either a NOR gate 320 with two input nodes coupled to each other or a NAND gate 330 with two input nodes coupled to each other can be utilized to implement the inverter 220 of the ring oscillator 162. The oscillating frequency $f_{OSC}$ of the ring oscillator 162 composed of the NOR gates 320 can represent the operating speed of the chip 100 dominated by the current path of the PMOS transistors more accurately, and the oscillating frequency $f_{OSC}$ of the ring oscillator 162 composed of the NAND gates 330 can represent the operating speed of the chip 100 dominated by the current path of the NMOS transistors more accurately.

Figure 4:
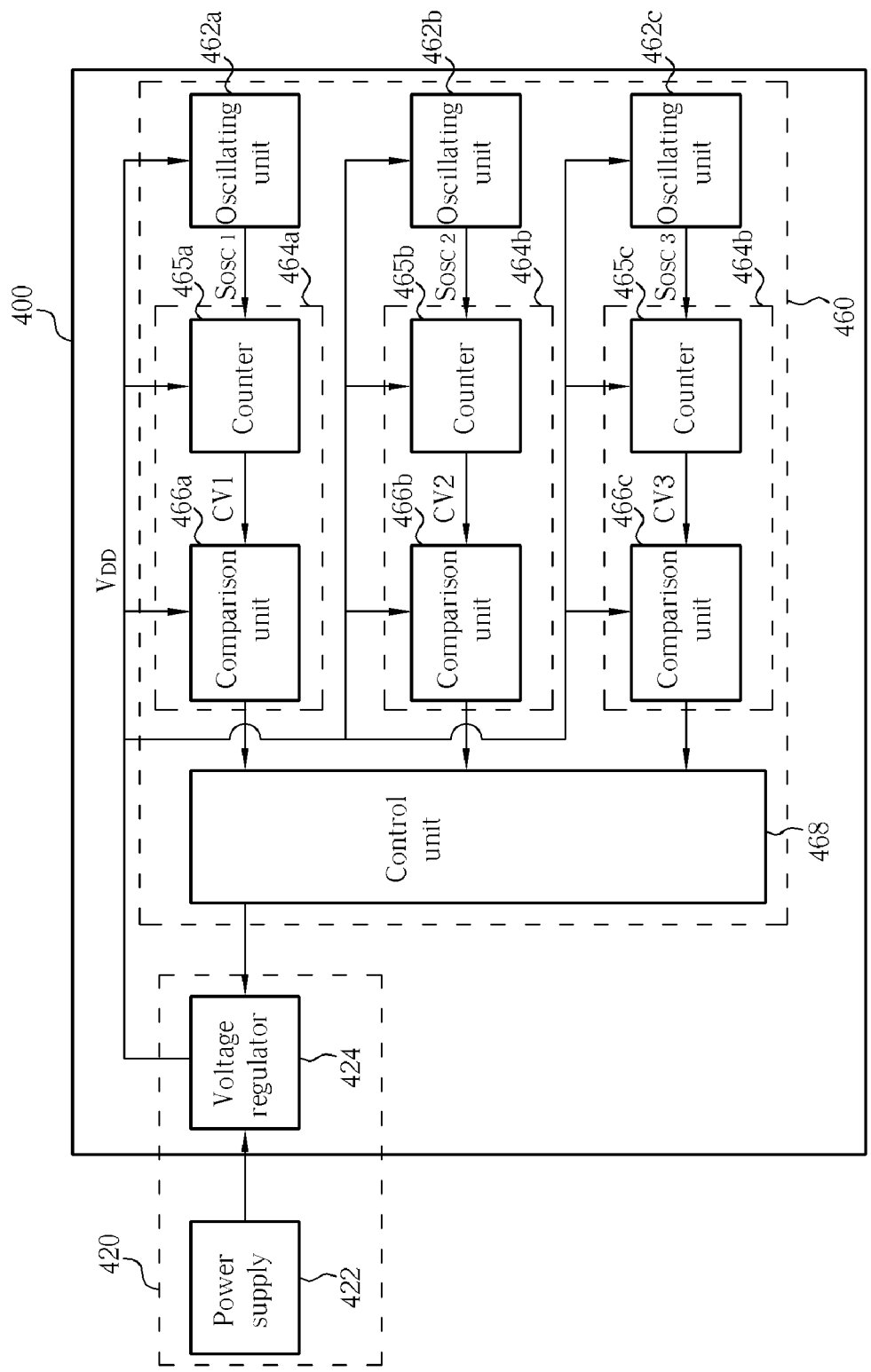
FIG. 4 is a diagram illustrating an automatic voltage control circuit according to another embodiment of the present invention.

FIG. 4 is a diagram illustrating an automatic voltage control circuit according to another embodiment of the present invention. In this embodiment an automatic voltage control circuit 460 is disposed in a chip 400, and a power supply unit 420 is utilized to provide a supply voltage $V_{DD}$ for offering power required by the operation of the internal devices of the chip 400. In this embodiment, the power supply unit 420 includes a power supply 422 positioned outside the chip 400 and a voltage regulator 424 positioned inside the chip 400, and the automatic voltage control circuit 460 includes three oscillating units 462a, 462b and 462c, three frequency-comparing units 464a, 464b and 464c, and a control unit 468.

For example, the oscillating unit 462a is a ring oscillator composed of the CMOS inverters 310 and is utilized for generating a first oscillating signal $S_{OSC1}$; the oscillating unit 462b is a ring oscillator composed of the NOR gates 320 and is utilized for generating a second oscillating signal $S_{OSC2}$; and the oscillating unit 462c is a ring oscillator composed of the NAND gates 330 and is utilized for generating a third oscillating signal $S_{OSC3}$.

Regarding the three frequency-comparing units 464a, 464b and 464c, consider the frequency-comparing unit 464a as an example. The frequency-comparing unit 464a includes a counter 465a and a comparison unit 466a. The counter 465a is utilized to count an oscillating number of the first oscillating signal $S_{OSC1}$ during a counting period to generate a first counting value CV1; and the comparison unit 466a is utilized to compare the first counting value CV1 with a first group of predetermined threshold values (i.e., compare the first oscillating frequency $f_{OSC1}$ of the first oscillating signal $S_{OSC1}$ with a first group of predetermined threshold frequencies, where the first group of predetermined threshold frequencies corresponds to the first group of predetermined threshold values). Since the function and the circuit structure of the frequency-comparing unit 464b and 464c are similar to that of the frequency-comparing unit 464a, further description is omitted here for the sake of brevity.

The control unit 468 can be implemented by a logic unit. If the first counting value CV1 is greater than a first predetermined threshold value TH1, the second counting value is greater than a second predetermined threshold value TH2, and the third counting value is greater than a third predetermined threshold value TH3, it indicates that the operating speed of the chip 400 is fast enough regardless of the current path of the chip 400 being a general current path, or dominated by the PMOS transistors or the NMOS transistors. Then the control unit 468 can control the voltage regulator 424 to decrease the supply voltage $V_{DD}$. Therefore, under allowed operational conditions, the power consumption of the chip 400 can be appropriately decreased and the accumulated heat generated by the operation of the chip 400 can also be decreased. If the first counting value CV1 is less than a fourth predetermined threshold value TH4, or the second counting value CV2 is less than a fifth predetermined threshold value TH5, or the third counting value CV3 is less than a sixth predetermined threshold value TH6, then the operating speed of a specific current path of the chip 400 fails to meet the system requirement. Thus, the control unit 468 at this time needs to control the voltage regulator 424 to increase the supply voltage VDD to guarantee the normal operation of the chip 400. The above-mentioned first and fourth predetermined threshold values TH1 and TH4 are used by the comparison unit 466a, where TH1 is greater than TH4; the second and fifth predetermined threshold values TH2 and TH5 are used by the comparison unit 466b, where TH2 is greater than TH5; and the third and sixth predetermined threshold values TH3 and TH6 are used by the comparison unit 466c, where TH3 is greater than TH6. It should be noted that the six predetermined threshold values TH1-TH6 can be generated by means of field trials.

The oscillating unit and the frequency-comparing unit according to one embodiment shown in FIG. 1 and three oscillating units and three frequency-comparing units according to another embodiment shown in FIG. 3 are for illustrative purposes only. In other embodiments, the automatic voltage control unit designed according to the present invention can include different numbers of oscillating units and frequency-comparing units.

Those skilled in the art will readily observe that numerous modifications and alterations of the device and method may be made while retaining the teachings of the invention.

What is claimed is:

1. An automatic voltage control circuit for controlling a power supply unit to adjust a supply voltage provided by the power supply unit, comprising:
    a ring oscillator, coupled to the power supply unit, for generating an oscillating signal, wherein the ring oscillator comprises a plurality of inverters, and at least one of the inverters comprises a NOR gate or a NAND gate;
    a frequency-comparing unit, coupled to the oscillating unit, for comparing an oscillating frequency of the oscillating signal with at least one predetermined threshold frequency to generate a comparison result; and
    a control unit, coupled to the frequency-comparing unit and the power supply unit, for controlling the power supply unit to adjust the supply voltage according to the comparison result.

2. The circuit of claim 1, wherein the frequency-comparing unit comprises:
    a counter, coupled to the oscillating unit, for calculating an oscillating number of the oscillating signal during a period of time to generate a counting value; and
    a comparison unit, coupled to the counter and the control unit, for comparing the counting value with at least one predetermined threshold value, wherein the predetermined threshold value corresponds to the predetermined threshold frequency.

3. The circuit of claim 1, wherein if the oscillating frequency is greater than a first predetermined threshold frequency of the predetermined threshold frequencies, the control unit controls the power supply unit to decrease the supply voltage.

4. The circuit of claim 1, wherein if the oscillating frequency is less than a second predetermined threshold frequency of the predetermined threshold frequencies, the control unit controls the power supply unit to increase the supply voltage.

5. The circuit of claim 1, wherein the control unit comprises a logic circuit.

6. An automatic voltage control circuit for controlling a power supply unit to adjust a supply voltage provided by the power supply unit, comprising:
    a plurality of ring oscillators, coupled to the power supply unit, for generating a plurality of oscillating signals, wherein each ring oscillator comprises a plurality of inverters, and at least one of the inverters comprise a NOR gate or a NAND gate;
    a plurality of frequency-comparing units, each of the plurality of frequency-comparing units respectively coupled to one of the oscillating units, for comparing an oscillating frequency of the each oscillating signal with at least one corresponding predetermined threshold frequency to generate a comparison result; and
    at least one control unit, coupled to the frequency-comparing units and the power supply unit, for controlling the power supply unit to adjust the supply voltage according to the comparison result.

7. The circuit of claim 6, wherein the each frequency-comparing unit comprises:
    a counter, coupled to the corresponding oscillating unit, for calculating an oscillating number of the oscillating signal during a period of time to generate a counting value; and
    a comparison unit, coupled to the counter and the control unit, for comparing the counting value with at least one predetermined threshold value, wherein the predetermined threshold value corresponds to the predetermined threshold frequency.

8. The circuit of claim 6, wherein if all the oscillating frequencies generated are greater than the corresponding predetermined threshold frequencies respectively, the control unit controls the power supply unit to decrease the supply voltage.

9. The circuit of claim 6, wherein if at least one of the oscillating frequencies generated is less than one of the predetermined threshold frequencies, the control unit controls the power supply unit to increase the supply voltage.

10. The circuit of claim 6, wherein at least one of the inverters comprises a CMOS inverter.

* * * * *